United States Patent
Mönnich

(10) Patent No.: US 11,141,861 B2
(45) Date of Patent: Oct. 12, 2021

(54) METHOD FOR OPERATING A ROBOT AND ROBOTIC ARM

(71) Applicant: Siemens Healthcare GmbH, Erlangen (DE)

(72) Inventor: Holger Mönnich, Friedberg (DE)

(73) Assignee: Siemens Healthcare GmbH, Erlangen (DE)

( * ) Notice: Subject to any disclaimer, the term of this patent is extended or adjusted under 35 U.S.C. 154(b) by 607 days.

(21) Appl. No.: 16/058,863

(22) Filed: Aug. 8, 2018

(65) Prior Publication Data
US 2019/0047153 A1    Feb. 14, 2019

(30) Foreign Application Priority Data
Aug. 8, 2017  (EP) ..................... 17185338

(51) Int. Cl.
*B25J 9/16*    (2006.01)

(52) U.S. Cl.
CPC ........... *B25J 9/1692* (2013.01); *B25J 9/1612* (2013.01); *B25J 9/1633* (2013.01); *B25J 9/1653* (2013.01);
(Continued)

(58) Field of Classification Search
CPC ...... B25J 9/1692; B25J 9/1612; B25J 9/1653; B25J 9/1633; B25J 9/1664; B25J 9/1605;
(Continued)

(56) References Cited

U.S. PATENT DOCUMENTS

| 6,294,890 B1 | 9/2001 | Shimada et al. |
| 9,014,857 B2 * | 4/2015 | Ota ........................ B25J 9/1669 700/262 |

(Continued)

FOREIGN PATENT DOCUMENTS

| CN | 106239516 A | 12/2016 |
| CN | 108326877 A | 7/2018 |

(Continued)

OTHER PUBLICATIONS

European Search Report for corresponding Application No. 17185338.5-1205, dated Jan. 29, 2018.

(Continued)

*Primary Examiner* — Masud Ahmed
(74) *Attorney, Agent, or Firm* — Lempia Summerfield Katz LLC

(57) ABSTRACT

The disclosure relates to a method for operating a robot as well as to a correspondingly operated robotic system. As part of the method, it is determined, if a difference between a current position of the robot and a target position of the robot exceeds a predetermined threshold value while the robot is in a torque-regulated operating mode. If the difference exceeds the threshold value, a predicted model-based intermediate state that the robot reaches before the target position according to the model is determined, wherein a speed of the robot in the intermediate state is lower than a predetermined speed threshold. When the robot reaches the intermediate state, the robot is automatically switched from the torque-regulated operating mode to a position-regulated operating mode. The robot then moves into the target position in the position-regulated operating mode.

20 Claims, 1 Drawing Sheet

(52) U.S. Cl.
CPC ... *B25J 9/1664* (2013.01); *G05B 2219/39321* (2013.01); *G05B 2219/42123* (2013.01); *G05B 2219/42126* (2013.01)

(58) Field of Classification Search
CPC ............ B25J 9/1628; B25J 13/00; G05B 2219/39321; G05B 2219/42123; G05B 2219/42126
See application file for complete search history.

(56) References Cited

U.S. PATENT DOCUMENTS

| | | | | |
|---|---|---|---|---|
| 2007/0270685 | A1* | 11/2007 | Kang | A61B 90/03 600/424 |
| 2009/0069942 | A1 | 3/2009 | Takahashi | |
| 2011/0029131 | A1* | 2/2011 | Ban | B25J 9/1692 700/254 |
| 2016/0354925 | A1 | 12/2016 | Shimodaira et al. | |
| 2017/0266807 | A1* | 9/2017 | Gombert | B25J 9/1617 |
| 2018/0207798 | A1 | 7/2018 | Tsuzaki | |
| 2020/0298403 | A1* | 9/2020 | Nilsson | G05B 19/401 |

FOREIGN PATENT DOCUMENTS

| | | |
|---|---|---|
| EP | 3088141 A2 | 11/2016 |
| JP | H10582 A | 1/1998 |

OTHER PUBLICATIONS

Chinese Office Action for Chinese Application No. 201810876043.4 dated May 21, 2021, with English translation.
European Office Action for European Application No. 17 185 338.5-1205 dated Jun. 8, 2021.

* cited by examiner

METHOD FOR OPERATING A ROBOT AND ROBOTIC ARM

The application claims the benefit of European Patent Application No. EP 17185338.5, filed Aug. 8, 2017, which is hereby incorporated by reference in its entirety.

TECHNICAL FIELD

The disclosure relates to a method for operating a robot and to a robotic system, which may be operated accordingly.

BACKGROUND

In the field of robotics, a robot may be operated in different operating modes, such as a position-regulated operating mode and a torque-regulated operating mode. Each of these different modes or methods has specific advantages and applications. A position-regulation or a position-regulated robot may offer a higher positional accuracy and may be robust against disturbances. The position-regulated robot, however, is not suited for gripping or joining component parts or for a force-regulated following of a predetermined path. While a torque-regulation or a torque-regulated robot solves these issues by regulating or controlling a torque or moment of force, the torque-regulated robot in turn offers a lower positional accuracy. Torque-regulated robots are disadvantageously also prone to positional drifting, in particular in low stiffness settings. Additionally, with regard to disturbances, the torque-regulated robot may be especially susceptible to positional errors. A purely torque-regulated robot may not be precisely and reliably positioned for gripping an object, such as a component part. A purely position-regulated robot on the other hand may not reliably non-destructively grip an object or component part without unrealistically precise knowledge of their exact shape and orientation. Therefore, a hybrid solution is needed.

In a conventional approach, the robot is moved into a position above the component part in a position-regulated operating mode. For actually gripping the component part, the robot is then switched to a torque-regulated operating mode only after the robot has come to a complete rest or standstill. Therefore, the conventional approach may be costly in terms of clock cycles or a cycle time needed for complex tasks or may prohibit using or switching to a respective optimal operating mode during tasks where the robot does not or may not come to a complete standstill.

SUMMARY AND DESCRIPTION

It is an objective of the present disclosure to enable a more flexible switching between different operating modes of a robot.

The scope of the present disclosure is defined solely by the appended claims and is not affected to any degree by the statements within this description. The present embodiments may obviate one or more of the drawbacks or limitations in the related art.

A method is disclosed for operating a robot. As part of this method, it is determined, if a difference between a current position or pose of the robot and a target position or pose of the robot exceeds a predetermined threshold value while the robot is in a torque-regulated operating mode. If, in particular only if, the difference exceeds the threshold value, a predicted model-based intermediate state, that the robot reaches before the target position according to the model, is determined, wherein a speed of the robot in the intermediate state is lower than a predetermined speed threshold. When the robot reaches the intermediate state, the robot is automatically switched from the torque-regulated operating mode to a position-regulated operating mode. The robot then moves into the target position in the position-regulated operating mode.

The robot may be an industrial robot, a lightweight robot, or a robotically moved tool or device. This means that an industrial robot for use in production technology may be considered to be a robot just as, for example, a C-arm X-ray device held or mounted through and moved by a robot arm.

The position or pose, the speed, and/or the state of the robot may refer to the corresponding parameter or value of the robot as a whole or of any part or section of the robot, such as an end effector. A pose is to be understood as a combination of a position and an orientation of the robot or a particular part thereof. A state of the robot may refer to or be characterized by the position of the robot, one or more joint positions or joint parameters, an orientation, and/or a speed or velocity of the robot.

For maneuverability and for flexible application of the robot, the robot may include at least one robot arm or manipulator, which in turn may include multiple links connected through respective joints. The robot may have multiple, (e.g., at least six), degrees of freedom (DOFs), which may correspond to the joints or axes of the robot or its manipulator.

To be able to determine the difference between the current position and the target position, the current position may be continuously monitored, modelled, and/or simulated. For this purpose, the robot may include one or more force sensors and/or torque sensors, which may provide sensor data as a basis for determining the current position. It is also possible to factor in a control signal sent to the robot and/or a state of a drive of the robot, e.g., an expended drive power or engine output of the robot, for determining the current position and/or the difference between the current position and the target position.

To determine the intermediate state, a motion of the robot may be modelled using a full-fledged complete model of the robot or a simplified model may be used. A simplified model may advantageously be processed or evaluated more quickly and/or with less computational effort, thus enabling real-time application of the presently described method. Because the speed of the robot is a main factor in determining or selecting the intermediate state, other factors or parameters of the complete model might not be needed or may be modelled less precisely, while still enabling the simplified model to provide adequate data for determining the intermediate state. If, for example, an acceleration of the robot is relatively low, then determining the intermediate state or a corresponding point in time, at which the robot reaches the determined intermediate state, with lower precision may be sufficient for the method to work. Determining the intermediate state may include an interpolation between different predetermined waypoints for the robot and/or between corresponding states. It may also be possible to extrapolate a current state and/or one or more past states and/or a motion leading up to the current position of the robot to determine or predict the intermediate state.

In certain scenarios, the robot or the current position of the robot may oscillate around the target position or a target trajectory with decreasing amplitude while the robot is in the torque-regulated operating mode. Because of this, it may take a significant amount of time for the robot to come to a standstill at or near the target position, as might for example be required for gripping or manipulating a target object, such as a component part. By switching from the torque-regulated operating mode to the position-regulated operating mode before the robot has reached the respective target position, that is, while the robot is, for example, still oscillating around the target position, the present disclosure may enable the robot to come to a standstill or to reach the target position in a shorter time and/or with improved positional accuracy. This may be the case, because moving the robot from its position at the intermediate state to the target position in the position-regulated operating mode may advantageously prevent further oscillations around the target position or an overshooting of the target position. It is a particular advantage of the present disclosure that this may be achieved without any negative effects or unrealistic effort, because the intermediate state is determined or selected in such a way, that, because of the corresponding speed of the robot being lower than the speed threshold, the switching between the operating modes may be done smoothly.

In an advantageous development, an average contouring error, (e.g., a contouring error of the robot in the position-regulated operating mode), is used as the threshold value. The average contouring error may be predetermined, for example, through testing by the manufacturer. The average contouring error may, in other words, be provided as a known value or input and/or as part of a specification of the robot. Using the average contouring error as the threshold value may be advantageous, because a corresponding tolerance needs to be considered anyway when operating the robot. If the difference between the current position and the target position is smaller than the average contouring error, the robot may be switched between the different operating modes without issue, because even the more positional accurate position-regulated operating mode is only expected to position the robot at the target position with a precision defined by the contouring error. If, however, the difference between the current position and the target position exceeds the average contouring error, then switching to the position-regulated operating mode may reduce a momentary positional error.

In an advantageous development, the robot is also set to a higher stiffness setting than was used in the torque-regulated operating mode with or when switching to the position-regulated operating mode. This means, that if and when the robot is operated in the position-regulated operating mode, the robot's stiffness is higher as compared to the stiffness of the robot if and when it is operated in the torque-regulated operating mode. The change in stiffness and switching between the operating modes may occur simultaneously. It is, however, possible for the change in stiffness to occur before or after switching between the operating modes, in particular, on a timescale of an execution of individual control commands. The higher stiffness or stiffness setting of the robot in the position-regulated operating mode may advantageously improve the positional accuracy and the robustness against disturbances, so that the target position may be reached faster and/or more accurate and/or be held more precisely.

In an advantageous development, the intermediate state is determined based on an interpolation of a motion of the robot between the current position and the target position. It may be advantageous to take into account a path of the robot that it followed to reach the current position. For a more accurate and reliable interpolation, predetermined constraint limiting or defining possible motions or movements of the robot may be taken into account. If, for example, the robot is currently moving away from the target position, then the robot may not instantaneously change its direction and move in an opposite direction towards the target position without a deceleration phase. Here, for example, a drive power of the robot and/or a mass of a load the robot is currently carrying may be taken into account.

The interpolation may be regarded as a simplified model of the robot or its motion. An interpolation between two fixed or known points may, however, be computed faster and easier than a complete model of the robot and its surroundings may be evaluated. Because the intermediate state or the speed of the robot in the intermediate state do not necessarily have to be known exactly, (as long as it is assured that the speed of the robot in the intermediate state is lower than the predetermined speed threshold), using the faster and easier to compute interpolation for determining the intermediate state may advantageously enable the application of the presently described method even in time-constrained or time-sensitive situations and/or when the robot or a robotic system the robot is part of only have limited computing power.

In an advantageous development, the model used for determining the intermediate state is adapted and/or is chosen from multiple predetermined models in dependence on a provided optimization criterion. The different adaptations or models may represent different strategies for operating the robot or for moving or guiding the robot into the target position. Each strategy may focus on or optimize for a different goal and/or constraint. This may advantageously allow for using the presently described method in different situations, scenarios, or use cases. Especially advantageous optimization criteria may be a maximized Cartesian positioning accuracy, a maximized accuracy in axis space, a maximized rate of convergence to the target position, and/or minimized jerk values of the motion of the robot.

The optimization criterion and therefore the corresponding adaptation or model to be used in a specific situation or instance may be predetermined. It may then be provided as an input for the robot or a control unit of the robot or a corresponding robotic system, for example, in dependence on a type of task or operation the robot is performing. It may, however, also be possible to determine or select the optimization criterion and/or the corresponding adaptation and/or model dynamically during operation of the robot, for example, in dependence on a measured value for the difference between the current position and the target position, and/or a jerk value, and/or in dependence on the measured or calculated rate of convergence to the target position.

Axis space is an abstract space, the dimensions of which may correspond to rotational and/or translational positions of the different axes of the robot or different rotational and/or translational positions of corresponding parts of the robot, such as a corresponding link of the manipulator, about the different axes of the robot.

While maximizing the positional accuracy and/or the accuracy in axis space are self-evident advantages, maximizing the rate of convergence to the target position may advantageously speed up an execution time of a current task of the robot, whereas minimizing the jerk values may advantageously improve handling of sensitive goods or loads, for example by reducing a risk of damaging them.

The different adaptations or models corresponding to the different optimization criteria may in turn correspond to, employ or include different control or regulation strategies and/or, for example, different settings for the stiffness, a maximum speed, a maximum acceleration, a maximum rate of change of direction of the robot, and/or the like. These different strategies and/or settings may be assumed or modelled for determining the intermediate state. This may enable the robot or a corresponding data processing device or control unit to automatically determine or select an optimum strategy and/or setting or set of settings. This may provide that the robot reaches an intermediate state, in which the robot's speed is lower than the predetermined speed threshold, before the target position. For this purpose, multiple different adaptations, models, strategies, and/or settings may be automatically evaluated and corresponding outputs or outcomes may be automatically compared.

A determined or selected adaptation, model, strategy, and/or setting may then be provided to a control unit controlling or regulating the robot. The control unit may then implement or use the provided adaptation, model, strategy, and/or setting to provide that the predicted intermediate state is actually reached at all, in the modelled manner, and/or with a higher probability.

It is, however, also possible that the model used for determining the intermediate state is adapted and/or chosen based on a control or regulation strategy and/or a model currently used by the control unit and/or based on a current setting of the control unit and/or the robot. The currently used strategy, model, and/or setting or set of settings may be automatically retrieved from a corresponding storage device of the control unit or of the robot.

In an advantageous development, a motion of the robot in the torque-regulated operating mode is modelled by modelling in torque space and in axis space a spring connecting the current position with the target position. An inflexion point of a motion of the spring corresponding to the motion of the robot is then determined as the intermediate state. A contraction and expansion of the spring may model the oscillation of the robot around the target position. Modelling the spring may therefore provide a simple to implement way for determining an intermediate state with suitable conditions, e.g., an intermediate state in which the speed of the robot is lower than the predetermined speed threshold. Because, at the inflexion point, the speed of the spring and therefore the corresponding speed of the robot (at least in one direction or dimension) is actually zero, the robot may be switched between operating modes at this point without a need for a complex transfer function or transfer vector for transferring or transforming a current state of the robot between different controllers, control units, and/or control or regulation models of the robot. By modelling the spring in torque space as well as in axis space, the current position of the robot at the inflexion point is immediately available to enable a precise operation of the robot in the position-regulated operating mode without any delay.

In an advantageous development, a value for a mass of the robot and a value for a mass of a load the robot is carrying are provided. For switching to the position-regulated operating mode, the current position of the robot is calculated or computed based on the provided mass values and a torque value measured in the torque-regulated operating mode. With the known mass values, the measured torque may be converted into a current acceleration of the robot. This acceleration may then be converted into a current axis position or current axes positions of the robot, thereby giving the current position or pose of the robot.

The robot may include one or more torque sensors for measuring the torque value. It may be especially advantageous, if at least one torque sensor is arranged in each joint of the robot or at each axis of the robot. The mass of the load may be measured through a corresponding load sensor of the robot or it may be provided as an external input. By calculating or computing the current position of the robot based on measured or externally provided (and therefore actual) values, the current position may be determined more precisely than by relying on a model or simulation of the robot, which may not take into account all external effects such as a mechanical tension affecting the robot through a mechanical contact with an external object. The improved accuracy or precision of the calculated or computed current position, which may be used as a starting point of the robot in the position-regulated operating mode, may in turn enable a higher positional accuracy of the robot in the position-regulated operating mode for reaching the target position.

In an advantageous development, the robot is switched back to the torque-regulated operating mode after the robot has reached the target position in the position-regulated operating mode. This means that the (then temporary) switch to the position-regulated operating mode between operating times of the robot in torque-regulated mode may serve to improve positional accuracy overall. While torque-regulation might be needed for certain tasks or subtasks of the robot, there may be phases or time-intervals during relatively long periods of torque-regulated operation, where the robot may advantageously be switched to position-regulated operating mode for a part of this phase or time-interval. This may improve the average positional accuracy and/or lower an execution time of the task or process carried out or performed during the whole phase or time interval.

Another aspect of the present disclosure is a robotic system. The robotic system includes a robot having multiple degrees of freedom, a data processing device, and a control device for controlling or regulating the robot in dependence on output data provided by the data processing device. The data processing device is configured to determine, if a difference between a current position of the robot and a target position exceeds a predetermined threshold value while the robot is in a torque-regulated operating mode. The data processing device is further configured to determine a predicted model-based intermediate state that the robot reaches before the target position according to the model, so that a speed of the robot in the intermediate state is lower than a predetermined speed threshold. In particular, the data processing device is configured to determine the intermediate state, if or only if the difference between the current position of the robot and the target position of the robot exceeds the threshold value.

The data processing device may also be configured to determine and/or continuously or regularly track the current position of the robot and to, in particular, continuously, determine or calculate the difference between the current position and the target position. The data processing device may be configured to provide the determined intermediate state to the control device as the output data.

The control device is configured to automatically switch the robot from the torque-regulated operating mode to a position-regulated operating mode when the robot reaches the intermediate state. The control device is further configured to steer the robot into the target position in the position-regulated operating mode.

The data processing device and the control device or control unit may be combined or integrated into a single integrated device.

The robotic system, (e.g., the control device), may include multiple regulators for different operating modes of the robot or the robotic system may include different algorithms or models for controlling or regulating the robot according to different operating modes.

The robotic system, (e.g., the data processing device and/or the control device, may include at least one a processing unit (CPU) and/or a storage medium, wherein the respective storage medium may contain a program code or a part thereof designed or configured to perform a method in accordance with at least one embodiment of the method on execution of the program code by the processing unit. The processing unit may be or include one or more microprocessors and/or computer chips.

The robotic system may be configured to execute the method.

The embodiments and developments of the present disclosure described herein for at least one aspect of the present disclosure, that is, for the method and the robotic system, as well as the corresponding advantages may be applied to any and all aspects of the present disclosure.

DETAILED DESCRIPTION

Further advantages, features, and details of the present disclosure derive from the following description of embodiments as well as from the drawings. The features and feature combinations previously mentioned in the description as well as the features and feature combinations mentioned in the following description of the figures and/or shown in the figures alone may be employed not only in the respectively indicated combination but also in other combinations or taken alone without leaving the scope of the present disclosure.

Figure 1:
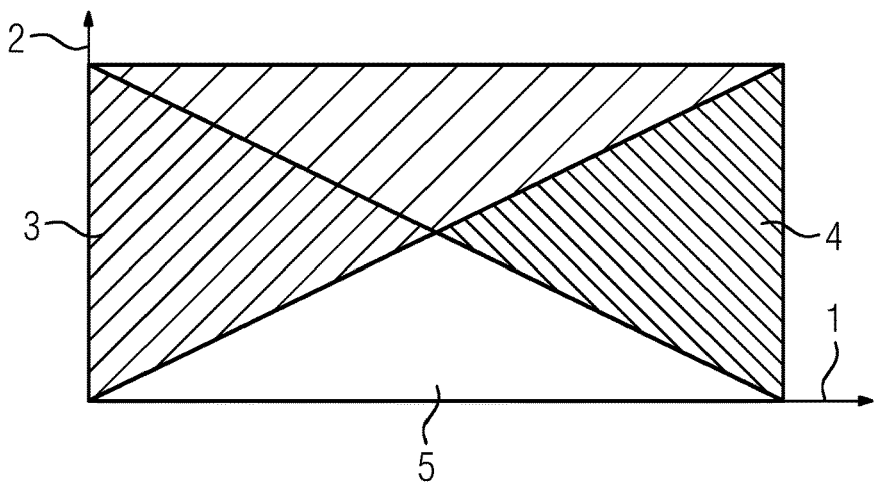
FIG. 1 schematically depicts an exemplary diagram illustrating different behaviors of a robot in different operating modes.

FIG. 1 schematically depicts a diagram illustrating different behaviors of a robot in different operating modes. An X-axis 1 of the diagram represents a stiffness or mechanical tension of the robot or affecting the robot, while a Y-axis 2 of the diagram represents a positioning error of the robot. The origin of the diagram, that is, minimal values on the X-axis 1 and the Y-axis 2, represent a state of zero positioning error and minimal stiffness or mechanical tension, such as during unhindered movement of the robot through air.

A first operating domain 3 represents a behavior or possible characteristics of the robot in an admittance control mode. Here, an exact positioning of the robot is achievable, in particular, if the motion of the robot is not hindered or influenced by a mechanical contact with an external object. With increasing stiffness, such as when the external object comes into contact with the robot and becomes more and more difficult to move, the minimum achievable positioning error or positional error of the robot increases.

A second operating domain 4 represents a behavior or characteristics of a robot operated in an impedance control mode. In this impedance control mode, the robot shows an opposite behavior or characteristic when compared to the admittance control mode. In the impedance control mode, the minimum achievable positioning error is comparably large when the motion of the robot is not hindered or limited by a high stiffness, e.g., when the robot may freely move through air. If, however, the robot comes into contact with a stiff external object, which may limit or prevent any drifting of the robot, the minimum achievable positioning error of the robot decreases.

At medium stiffness values and medium to high positioning errors the first operating domain 3 and the second operating domain 4 overlap, meaning that corresponding behaviors or states of the robot may be achieved or may occur when using either one of the operating modes.

A region 5 in the diagram represents behaviors, characteristics, or states which are not readily accessible using currently available robot controllers or regulators. Points along the X-axis 1 may be thought of as representing a theoretically ideal robot or an ideal robot control or operating mode, because it would be desirable to achieve zero positioning error regardless of a stiffness or an external contact.

Because the positional error in the impedance control or torque-regulated operating mode may be on the order of several millimeters or even centimeters, it may be desirable to use the admittance control or position-regulated operation mode. Because certain applications, such as a gripping a destructible object or joining, in particular complexly shaped, component parts, may require the torque-regulated operation mode, it is desirable to be able to switch between both operating modes.

Figure 2:
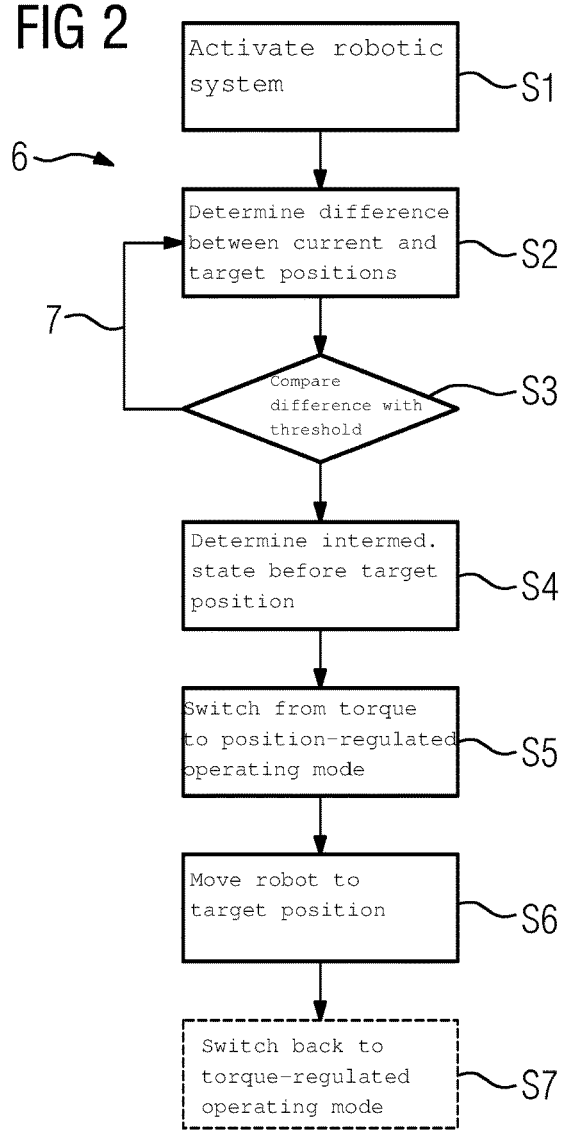
FIG. 2 schematically depicts an exemplary flow chart illustrating a method for operating a robot.

FIG. 2 schematically depicts an exemplary flow chart 6 illustrating a method for operating a robot using both a torque-regulated operating mode and a position-regulated operating mode. In a process act S1, the method is started. Here, the robot or a corresponding robotic system including the robot, a data processing device and a control device, may be activated. Also, a task and a target position for the robot may be provided or acquired.

For the described example, the method is started with the robot being operated in torque-regulated operating mode. At this point, a continuous monitoring of a current position of the robot may be activated or be already active. This monitoring may remain active during the following process acts.

For the present example, the robot may be an industrial robot tasked with gripping a gear wheel from a supply, moving it to a target position, and from there assembling it into a gear mechanism. In a following task cycle the robot then moves via the target position back to the supply to grip the next gear wheel from the supply.

In a process act S2, a difference between the current position or pose and the target position or pose of the robot, in particular of an end effector of the robot, is determined. This may be done through a simple comparison.

In a process act S3, it is determined, if the difference between the current position and the target position is greater than a predetermined threshold value. As indicated by a loop 7, the process acts S2 and S3 may be continuously or regularly carried out or repeated.

If the difference between the current position and the target position is greater than the threshold value, the method moves to a process act S4. Here, an intermediate state that the robot will or at least may reach before the target position is determined based on a corresponding model or interpolation. A constraint for the intermediate state is that a speed of the robot in the intermediate state is lower than a predetermined speed threshold.

In order for the robot to be able to easily, precisely and reliably grip or pick the gear wheels from the supply and assemble the gear mechanism, a model, strategy and/or setting for maximizing a positional accuracy may be used. It may also be advantageous to use a model, strategy and/or setting to enable a maximum rate of convergence to the target position in the following acts of the method to improve efficiency of the robot.

When the robot reaches the determined intermediate state, it is automatically switched from the torque-regulated operating mode to the position-regulated operating mode in a process act S5.

In a process act S6, the robot then automatically moves to the target position in the position-regulated operating mode. This enables an especially quick compensation of a positional error of the robot, which may not be reliably avoided during the previous torque-regulated operation of the robot.

The robot may be quickly and precisely brought or steered into the target position after assembling the currently transported gear wheel into the gear mechanism. Precisely positioning the robot at the target position may advantageously provide that the robot does not unintentionally collide with any external object on its path back to the supply, because the robot starts from a precisely known position, e.g., the target position.

The robot may then move to the gear wheel supply. There it may automatically switch or be switched back to the torque-regulated operating mode in an optional process act S7 to enable a non-destructive gripping of the next gear wheel from the supply. Switching from the position-regulated operating mode to the torque-regulated operating mode may be done more easily than switching in the opposite direction from the torque-regulated operating mode to the position-regulated operating mode. This is the case, because in the position-regulated operating mode the robot is already precisely and reliably located at its respective target position or on its respective intended or target path.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for operating a robot, the method comprising:
   determining, by a data processing device, a difference between a current position of the robot and a target position of the robot;
   identifying, by the data processing device, when the difference exceeds a predetermined threshold value while the robot is in a torque-regulated operating mode;
   modelling a motion of the robot in the torque-regulated operating mode by modeling in torque space and in axis space a spring connecting the current position with the target position;
   determining, by the data processing device, a predicted model-based intermediate state that the robot reaches before the target position according to the model, wherein a speed of the robot in the intermediate state is lower than a predetermined speed threshold;
   automatically switching, by a control device, when the robot reaches the intermediate state, the robot from the torque-regulated operating mode to a position-regulated operating mode; and
   moving, by the control device, the robot into the target position in the position-regulated operating mode.

2. The method of claim 1, wherein the predetermined threshold value is an average contouring error of the robot.

3. The method of claim 1, wherein, in switching to the position-regulated operating mode, the robot is set to a higher stiffness setting than was present in the torque-regulated operating mode.

4. The method of claim 1, wherein the intermediate state is determined based on an interpolation of the motion of the robot between the current position and the target position.

5. The method of claim 1,
   wherein an inflection point of a motion of the spring is determined as the intermediate state.

6. The method of claim 1, further comprising:
   switching, by the control device, back to the torque-regulated operating mode after the robot has reached the target position.

7. A method for operating a robot, the method comprising:
   determining, by a data processing device, a difference between a current position of the robot and a target position of the robot;
   identifying, by the data processing device, when the difference exceeds a predetermined threshold value while the robot is in a torque-regulated operating mode;
   determining, by the data processing device, a predicted model-based intermediate state that the robot reaches before the target position according to a model, wherein a speed of the robot in the intermediate state is lower than a predetermined speed threshold;
   automatically switching, by a control device, when the robot reaches the intermediate state, the robot from the torque-regulated operating mode to a position-regulated operating mode; and
   moving, by the control device, the robot into the target position in the position-regulated operating mode,
   wherein, in dependence on a provided optimization criterion, the model used for determining the intermediate state is adapted from multiple predetermined models, chosen from the multiple predetermined models, or a combination thereof.

8. The method of claim 7, wherein the provided optimization criterion is a maximized Cartesian positioning accuracy, a maximized accuracy in axis space, a maximized rate of convergence to the target position, minimized jerk values of the motion of the robot, or a combination thereof.

9. The method of claim 7, wherein the predetermined threshold value is an average contouring error of the robot.

10. The method of claim 7, wherein, in switching to the position-regulated operating mode, the robot is set to a higher stiffness setting than was present in the torque-regulated operating mode.

11. The method of claim 7, wherein the intermediate state is determined based on an interpolation of a motion of the robot between the current position and the target position.

12. The method of claim 7, wherein a motion of the robot in the torque-regulated operating mode is modelled by modelling in torque space and in axis space a spring connecting the current position with the target position, and
   wherein an inflection point of a motion of the spring is determined as the intermediate state.

13. The method of claim 7, further comprising:
switching, by the control device, back to the torque-regulated operating mode after the robot has reached the target position.

14. A method for operating a robot, the method comprising:
providing a value for a mass of the robot and a value for a mass of a load the robot is carrying;
determining, by a data processing device, a difference between a current position of the robot and a target position of the robot;
identifying, by the data processing device, when the difference exceeds a predetermined threshold value while the robot is in a torque-regulated operating mode;
determining, by the data processing device, a predicted model-based intermediate state that the robot reaches before the target position according to a model, wherein a speed of the robot in the intermediate state is lower than a predetermined speed threshold;
automatically switching, by a control device, when the robot reaches the intermediate state, the robot from the torque-regulated operating mode to a position-regulated operating mode, wherein, for the switching to the position-regulated operating mode, the current position of the robot is calculated based on the provided mass values of the robot and the load and a torque value measured in the torque-regulated operating mode; and
moving, by the control device, the robot into the target position in the position-regulated operating mode.

15. The method of claim 14, wherein the predetermined threshold value is an average contouring error of the robot.

16. The method of claim 14, wherein, in switching to the position-regulated operating mode, the robot is set to a higher stiffness setting than was present in the torque-regulated operating mode.

17. The method of claim 14, wherein the intermediate state is determined based on an interpolation of a motion of the robot between the current position and the target position.

18. The method of claim 14, wherein a motion of the robot in the torque-regulated operating mode is modelled by modelling in torque space and in axis space a spring connecting the current position with the target position, and
wherein an inflection point of a motion of the spring is determined as the intermediate state.

19. The method of claim 14, further comprising:
switching, by the control device, back to the torque-regulated operating mode after the robot has reached the target position.

20. A robotic system comprising:
a robot having multiple degrees of freedom;
a data processing device; and
a control device for regulating the robot in dependence on output data provided by the data processing device,
wherein the data processing device is configured to:
determine a difference between a current position of the robot and a target position of the robot,
identify when the difference exceeds a predetermined threshold value while the robot is in a torque-regulated operating mode,
model a motion of the robot in the torque-regulated operating mode by modeling in torque space and in axis space a spring connecting the current position with the target position, and
determine a predicted model-based intermediate state, that the robot reaches before the target position according to the model, wherein a speed of the robot in the intermediate state is lower than a predetermined speed threshold, and
wherein the control device is configured to:
automatically switch the robot from the torque-regulated operating mode to a position-regulated operating mode when the robot reaches the intermediate state, and
steer the robot into the target position in the position-regulated operating mode.

* * * * *